US012010422B2

(12) United States Patent
Yamakabe et al.

(10) Patent No.: US 12,010,422 B2
(45) Date of Patent: Jun. 11, 2024

(54) IMAGE ACQUIRING DEVICE, IMAGE ACQUIRING METHOD, AND IMAGE PROCESSING DEVICE

(71) Applicant: NEC Corporation, Tokyo (JP)

(72) Inventors: Ryo Yamakabe, Tokyo (JP); Yuka Ogino, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 17/801,925

(22) PCT Filed: Feb. 28, 2020

(86) PCT No.: PCT/JP2020/008421
§ 371 (c)(1),
(2) Date: Aug. 24, 2022

(87) PCT Pub. No.: WO2021/171586
PCT Pub. Date: Sep. 2, 2021

(65) Prior Publication Data
US 2023/0100016 A1    Mar. 30, 2023

(51) Int. Cl.
*H04N 23/67* (2023.01)
*G02B 7/04* (2021.01)
(Continued)

(52) U.S. Cl.
CPC .............. *H04N 23/67* (2023.01); *G02B 7/04* (2013.01); *G03B 13/36* (2013.01); *G06V 40/193* (2022.01)

(58) Field of Classification Search
None
See application file for complete search history.

(56) References Cited

U.S. PATENT DOCUMENTS 10,074,031 B2 *   9/2018   Krenzer ................... G06T 3/40
2009/0174765 A1   7/2009   Namba et al.
(Continued)

FOREIGN PATENT DOCUMENTS

JP      2010-258552 A    11/2010
JP      2013-040791 A     2/2013
(Continued)

OTHER PUBLICATIONS

JP Office Action for JP Application No. 2022-503026, dated Aug. 22, 2023 with English Translation.
(Continued)

*Primary Examiner* — James M Hannett
(74) *Attorney, Agent, or Firm* — Sughrue Mion, PLLC

(57) ABSTRACT

The image acquiring device 10 includes the voltage control unit 30 which generates first voltage information that can identify voltage applied to the first variable-focus lens 20A included in the first imaging unit 20 installed in a position where a subject can be photographed and whose focal length changes in accordance with an applied voltage, and generates second voltage information that can identify voltage applied to the second variable-focus lens 21A included in the second imaging unit 21 installed in the position where the subject can be photographed and whose focal length changes in accordance with an applied voltage, and the image judgment unit 40 which inputs images from the first imaging unit 20 and the second imaging unit 21, and selects one image taken at an in-focus position among input images, wherein the voltage control unit 30 generates information, as the first voltage information, that can identify each voltage in a time series of voltages whose values change with time, and generates information, as the second voltage information, that can identify that each of the voltages identified by
(Continued)

the first voltage information is applied to the second variable-focus lens 21A after a predetermined period of delay.

9 Claims, 6 Drawing Sheets

(51) Int. Cl.
 *G03B 13/36* (2021.01)
 *G06V 40/18* (2022.01)

(56) References Cited

U.S. PATENT DOCUMENTS

| | | |
|---|---|---|
| 2010/0271537 A1 | 10/2010 | Endoh et al. |
| 2013/0038723 A1 | 2/2013 | Tsutsumi |
| 2013/0070061 A1 | 3/2013 | Pan |
| 2013/0089240 A1 | 4/2013 | Northcott et al. |
| 2013/0194548 A1 | 8/2013 | Francis et al. |
| 2017/0168200 A1 | 6/2017 | Corcoran et al. |
| 2018/0270408 A1 | 9/2018 | Chen et al. |
| 2019/0273873 A1 | 9/2019 | Mao et al. |

FOREIGN PATENT DOCUMENTS

| | | |
|---|---|---|
| JP | 2016-510628 A | 4/2016 |
| JP | 2017-083962 A | 5/2017 |
| WO | 2008/016035 A1 | 2/2008 |
| WO | 2011/142422 A1 | 11/2011 |

OTHER PUBLICATIONS

Extended European Search Report for EP Application No. 20921065.7, dated Mar. 2, 2023.
International Search Report for PCT Application No. PCT/JP2020/008421, dated May 19, 2020.

* cited by examiner

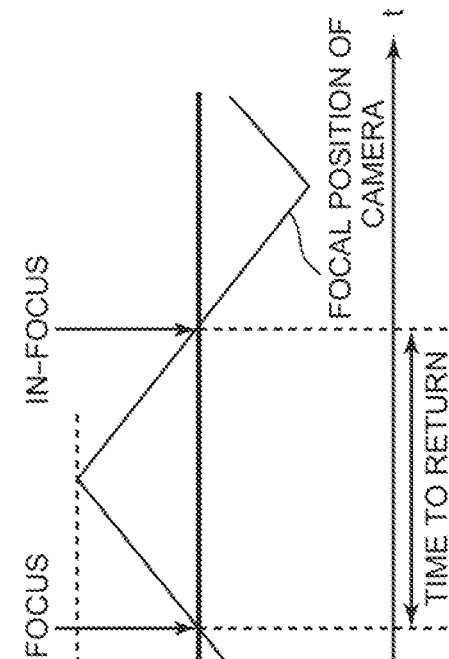
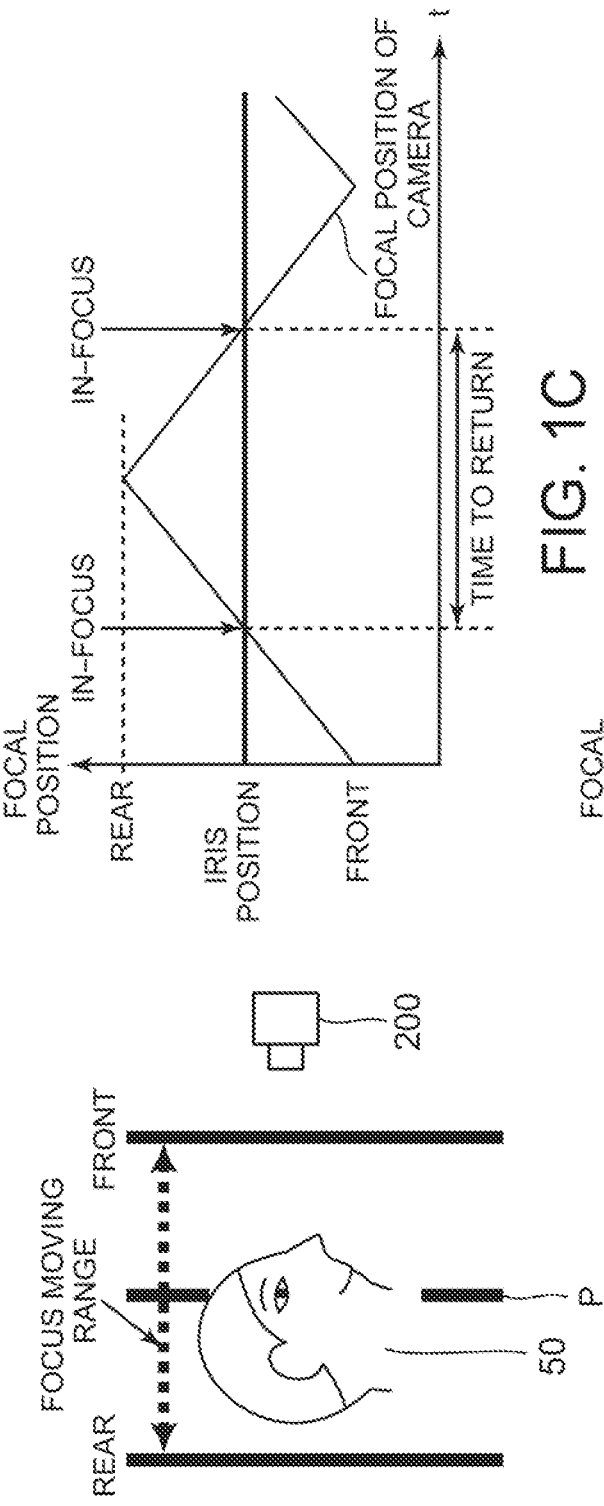
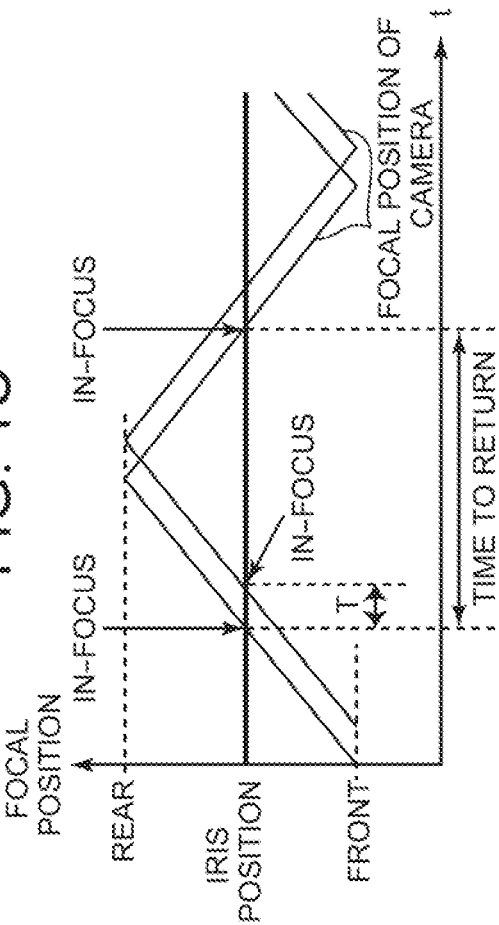

IMAGE ACQUIRING DEVICE, IMAGE ACQUIRING METHOD, AND IMAGE PROCESSING DEVICE

This application is a National Stage Entry of PCT/JP2020/008421 filed on Feb. 28, 2020, the contents of all of which are incorporated herein by reference, in their entirety.

TECHNICAL FIELD

This disclosure relates to an image acquiring device, an image acquiring method, and an image processing device that are suitably applied to iris recognition.

BACKGROUND ART

Biometrics using an iris, that is, iris recognition, is known. In iris recognition, the iris of a person to be authenticated is photographed using an imaging device, and features are extracted from the pattern of the photographed iris. When the person is authenticated, the extracted features are compared with the features registered in a database in advance, and a pass or fail decision is made based on a matching score. When registering a person to be authenticated, the extracted features are registered in a database.

When performing iris recognition, if the distance between the iris (i.e., a subject) of an object and a camera changes while the object is being photographed, the camera may not be able to take an image in focus. In response to this problem, for example, a device has been proposed that moves the camera lens in the optical axis direction so that the camera focuses on each of a predetermined plurality of positions and photographs at each position (refer to patent literature 1, for example). The device selects one image that is presumed to be in focus from a plurality of images after taking the plurality of images. The device then performs iris recognition using the selected image.

In addition, patent literature 2 describes a device that utilizes a liquid lens to perform image processing.

CITATION LIST

Patent Literature

PTL 1: Japanese Patent Laid-Open No. 2017-083962
PTL 2: Japanese Patent Laid-Open No. 2010-258552

SUMMARY OF INVENTION

Technical Problem

In the device described in patent literature 1, even if the first photographed image is a focused image, iris recognition does not start until multiple images have been photographed. In addition, if a part of the iris being the subject is hidden in the focused image due to blinking of the eyes or other reasons, iris recognition will not be performed correctly. In such cases, the device will have to redo the photographing of the multiple images itself. Therefore, when using the device described in patent literature 1, iris recognition takes a long time.

It is an object of the present invention to provide an image acquiring device and an image acquiring method that can shorten the time until an image used for image processing is acquired. It is also an object of the present invention to provide an image processing device that can shorten the time until the process of acquiring an image suitable for image processing is completed.

Solution to Problem

The image acquisition apparatus according to the present invention includes voltage control means for generating first voltage information that can identify voltage applied to a first variable-focus lens which is included in first imaging means installed in a position where a subject can be photographed and whose focal length changes in accordance with an applied voltage, and generating second voltage information that can identify voltage applied to a second variable-focus lens which is included in second imaging means installed in the position where the subject can be photographed and whose focal length changes in accordance with an applied voltage; and image judgment means for inputting images from the first imaging means and the second imaging means, and selecting one image taken at an in-focus position among input images, wherein the voltage control means generates information, as the first voltage information, that can identify each voltage in a time series of voltages whose values change with time, and generates information, as the second voltage information, that can identify that each of the voltages identified by the first voltage information is applied to the second variable-focus lens after a predetermined period of delay.

The image acquisition method according to the present invention includes generating first voltage information that can identify voltage applied to a first variable-focus lens which is included in first imaging means installed in a position where a subject can be photographed and whose focal length changes in accordance with an applied voltage, and generating second voltage information that can identify voltage applied to a second variable-focus lens which is included in second imaging means installed in the position where the subject can be photographed and whose focal length changes in accordance with an applied voltage, wherein the first voltage information is information that can identify each voltage in a time series of voltages whose values change with time, the second voltage information is information that can identify information that each of the voltages identified by the first voltage information is applied to the second variable-focus lens after a predetermined period of delay, and the method further includes selecting one image taken at an in-focus position among images input from the first imaging means and the second imaging means.

The image acquisition program according to the present invention causes a computer to execute a process of generating first voltage information that can identify voltage applied to a first variable-focus lens which is included in first imaging means installed in a position where a subject can be photographed and whose focal length changes in accordance with an applied voltage, and generating second voltage information that can identify voltage applied to a second variable-focus lens which is included in second imaging means installed in the position where the subject can be photographed and whose focal length changes in accordance with an applied voltage, wherein the first voltage information is information that can identify each voltage in a time series of voltages whose values change with time, the second voltage information is information that can identify information that each of the voltages identified by the first voltage information is applied to the second variable-focus lens after a predetermined period of delay, and the image acquiring program causes the computer to further execute a process of selecting one image taken at an in-focus position among images input from the first imaging means and the second imaging means.

Advantageous Effects of Invention

According to the present invention, the time until an image used for image processing such as iris recognition is acquired can be shortened. The time until the process of acquiring images suitable for image processing is completed can be also shortened.

BRIEF DESCRIPTION OF DRAWINGS

FIG. 1A It depicts an explanatory diagram showing an overview of control of the image acquiring device.

FIG. 1B It depicts an explanatory diagram showing an overview of control of the image acquiring device.

FIG. 1C It depicts an explanatory diagram showing an overview of control of the image acquiring device.

DESCRIPTION OF EMBODIMENTS

Figure 2:
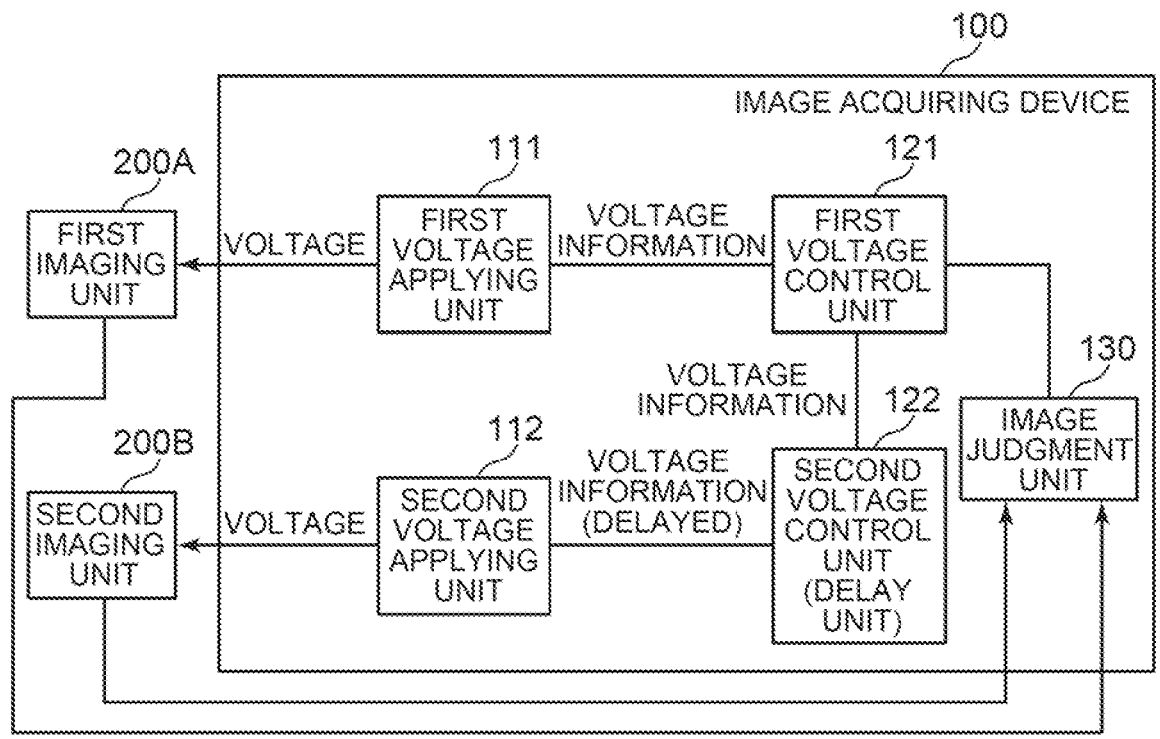
FIG. 2 It depicts a block diagram showing an example of the configuration of the image acquiring device of the first example embodiment.

FIG. 1A to FIG. 1C are explanatory diagrams showing an overview of control of the image acquiring device of the example embodiment.

As shown in FIG. 1A, the imaging unit (camera) 200 facing the object 50 to be authenticated is installed so that the eye area including both eyes (including the iris) of the object 50 can be photographed. The imaging unit 200 changes the focal length within a predetermined focus moving range. In other words, the imaging unit 200 changes the focal position. The focus moving range is a range in which at least the iris of the object 50 will match the focal position during the movement of the imaging unit 200.

FIG. 1B shows an aspect where a single imaging unit 200 (in detail, the camera lens) changes focal length. FIG. 1C shows an aspect where two imaging units 200 change focal length. The change in focal position shown in FIG. 1C corresponds to the change of the following example embodiments. That is, the image acquiring device of the example embodiments controls the focal length of the two imaging units 200. In FIGS. 1B and 1C, "front" indicates the end closest to the imaging unit 200 in the focus moving range, and "rear" indicates the furthest end from the imaging unit 200 in the focus moving range. A liquid lens that changes its lens power (the reciprocal of the focal length) in response to an applied voltage is used as the lens of the imaging unit 200. In other words, the focal length of the liquid lens changes according to the change of the applied voltage.

The case will be assumed where the focal length is controlled so that the focal position of the imaging unit 200 stepwisely changes from the "front" position to the "rear" position and then stepwisely changes from the "rear" position to the "front" position, i.e., the focal position goes and returns. The "time to return" indicates the time required for the focal point to make a round trip from the starting point at position P. In FIGS. 1B and 1C, the focal position is shown to change linearly, however in the example embodiments, the value of the voltage applied to the imaging unit 200 sequentially changes stepwisely. Thus, in reality, the change in focal position is stepwise.

In the example shown in FIG. 1B, a single imaging unit 200 stepwisely changes focal length, and each time the focal length changes, the imaging unit 200 photographs the object 50 (specifically, the eye area).

In this specification, "in focus" means that the focal point P matches the position of the iris of the object 50. Therefore, image processing (image analysis) such as iris recognition is performed using the image taken at the "in-focus" position. Hereafter, the image taken at the "in-focus" position is referred to as an in-focus image.

If the eyelids of the object 50 are closed due to blinking, etc., when an in-focus image is taken, iris recognition, etc., based on that image cannot be performed. In the example shown in FIG. 1B, if the in-focus image is acquired when the eyelids of the object are closed, an in-focus image must be acquired again after making a round trip of the focal point position starting from the point where the image was first in focus. Therefore, it takes time to complete iris recognition, etc.

In the example shown in FIG. 1C, for a change in the focal position of one imaging unit 200, the other imaging unit 200 changes its focal position with a delay. In FIG. 1C, "T" indicates a delay time of the change in focal position of the other imaging unit 200.

Even if the eyelids of the object 50 are closed due to blinking, etc., when an in-focus image is taken by one imaging unit 200, there is a high possibility that an in-focus image in which the eyelids are not closed will be acquired immediately afterwards by the other imaging unit 200. Therefore, the time until iris recognition, etc. is completed is shortened compared to the example shown in FIG. 1B. The delay time T is set to a time equivalent to the time required for a typical object 50 to blink. Since the time required for a blink of a typical subject 50 is any of 150 to 250 ms, it is preferable to select the delay time T from within that time interval (with a margin, for example, from 100 to 300 ms). As an example, the delay time T is set to 200 ms. Example embodiment 1.

FIG. 2 is a block diagram showing an example of the configuration of the image acquiring device, together with an imaging unit.

The image acquiring device 100 shown in FIG. 2 controls a first imaging unit 200A and a second imaging unit 200B, and inputs images taken by the first imaging unit 200A and the second imaging unit 200B. The image acquiring device 100 includes a first voltage applying unit 111, a second voltage applying unit 112, a first voltage control unit 121, a second voltage control unit (a delay unit) 122, and an image judgment unit 130.

The first imaging unit 200A and the second imaging unit 200 B are each installed in a position where faces of objects (at least, the area that includes both eyes) can be photographed. In this example embodiment, each of the first imaging unit 200A and the second imaging unit 200B includes a liquid lens whose focal length is determined according to an applied voltage. Variable-focus lenses other than liquid lenses may be used as long as the focal length is electrically changed.

The first voltage control unit 121 generates voltage information from control information (control data) input from the image judgment unit 130. The first voltage control unit 121 outputs the voltage information to the first voltage applying unit 111 and the second voltage control unit 122. The voltage information output by the first voltage control unit 121 corresponds to the first voltage information.

The control data includes, for example, a trigger for the start of voltage control and information indicating that an image has been captured from the first imaging unit 200A. The control data corresponds to data indicating timing for switching the voltage value applied to the liquid lens in the first imaging unit 200A.

The first voltage information is information that can identify a voltage value that the first voltage control unit 121 applies to the liquid lens in the first imaging unit 200A. The first voltage information is information that indicates a voltage value itself, such as 3V, for example. In the case where the pattern of time-sequentially changing voltages (for example, 0.5V change every 16 ms between 0 and 30V) is predetermined, the first voltage information may be information indicating only the point in time at which the voltage value is switched.

The second voltage control unit 122 generates voltage information based on the first voltage information and outputs the voltage information to the second voltage applying unit 112. The voltage information output by the second voltage control unit 122 corresponds to the second voltage information.

When the delay time T elapses from the time when the first voltage information is input, the second voltage control unit 122 outputs the first voltage information to the second voltage applying unit 112 as the second voltage information.

When the first voltage information is input, the first voltage applying unit 111 applies a voltage of the value identified by the first voltage information to the liquid lens in the first imaging unit 200A. When the second voltage information is input, the second voltage applying unit 112 applies a voltage of the value identified in the second voltage information to the liquid lens in the second imaging unit 200B.

The image judging unit 130 inputs images taken by each of the first imaging unit 200A and the second imaging unit 200B. It is preferable that an image input cycle is about the same as a cycle for switching the voltage value applied to the liquid lens.

Figure 3:
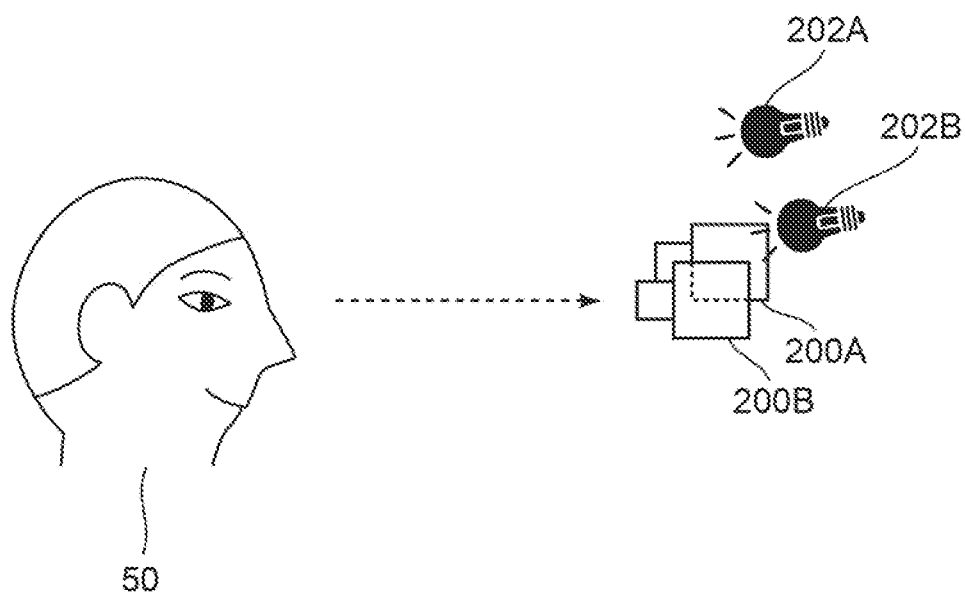
FIG. 3 It depicts an explanatory diagram showing an example of the arrangement of the first imaging unit and second imaging unit.

FIG. 3 is an explanatory diagram showing an example of the arrangement of the first imaging unit 200A and the second imaging unit 200B. In this example embodiment, assume that the position where the object 50 of iris recognition is predetermined to a default position, when iris recognition is performed. As shown in FIG. 3, the first imaging unit 200A and the second imaging unit 200B are installed at positions where they can take iris images (images of a small area including the iris) of the object 50 at the default position. In consideration of multiple objects 50 of varying heights, multiple pairs of the first imaging unit 200A and the second imaging unit 200B are installed at different heights from the ground or floor. In that case, one pair matching the height of the object 50 is used for the authentication process. For example, a wide-area imaging camera (full overhead camera) capable of photographing the entire body of persons of various heights may be installed, and a pair of the first imaging unit 200A and the second imaging unit 200B which can take an iris image of the object 50 is selected based on a wide-area image supplied by the wide-area imaging camera.

The lighting devices 202A, 202B for irradiating light (for example, near-infrared light) to the object 50 are also installed. The lighting devices 202A, 202B include a light source (for example, LED: Light Emitting Diode). The lighting devices 202A, 202B may be controlled to irradiate light during the period from the start to the end of image input. Alternatively, the lighting devices 202A, 202B may be controlled to be under a state where they irradiate light at all times. In addition, the lighting devices 202A, 202B may be turned on only at the timing when the first imaging unit 200A and the second imaging unit 200B are photographing.

Figure 4:
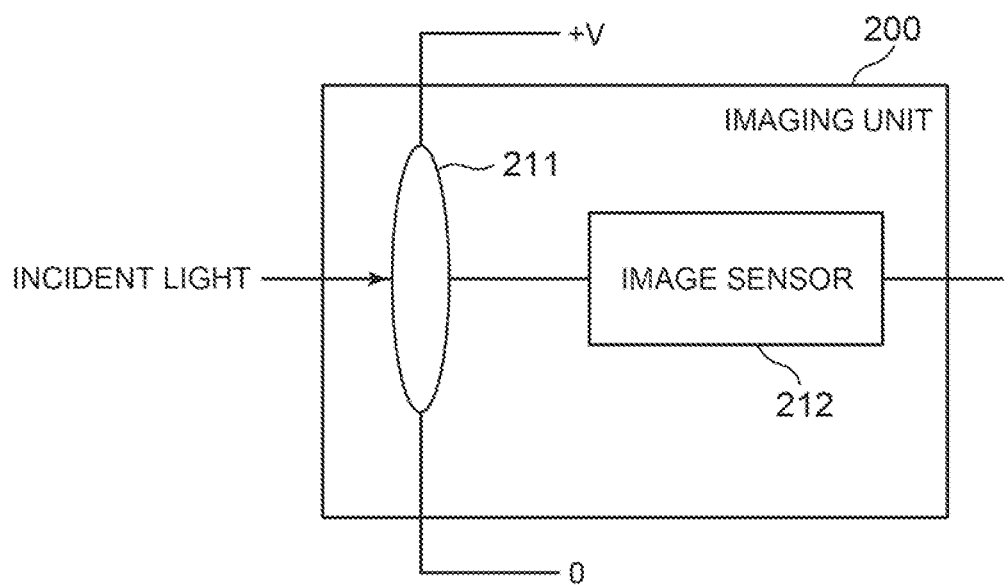
FIG. 4 It depicts a block diagram showing an example of the configuration of the imaging unit.

FIG. 4 is a block diagram showing an example of the configuration of of the first imaging unit 200A and the second imaging unit 2. FIG. 4 shows an imaging unit 200 representing the first imaging unit 200A and the second imaging unit 200B.

The imaging unit 200 includes a liquid lens 211 and an image sensor 212. The image sensor 212 is a CMOS (Complementary Metal Oxide Semiconductor) sensor for example, however it may also be a CCD (Charge Coupled Device) sensor.

Next, the operation of the image acquiring device 100 will be described with reference to the sequence diagram in FIG. 5. Although the imaging unit, the voltage control unit, the voltage applying unit, and the image judgment unit are described in FIG. 5, as described above, there are actually the first imaging unit 200A and the second imaging unit 200B as the imaging units. There are the first voltage control unit 121 and the second voltage control unit 122 as the voltage control units. There are the first voltage applying unit 111 and the second voltage applying unit 112 as voltage applying units. The image judging unit shown in FIG. 5 corresponds to the image judging unit 130 in FIG. 2.

Figure 5:
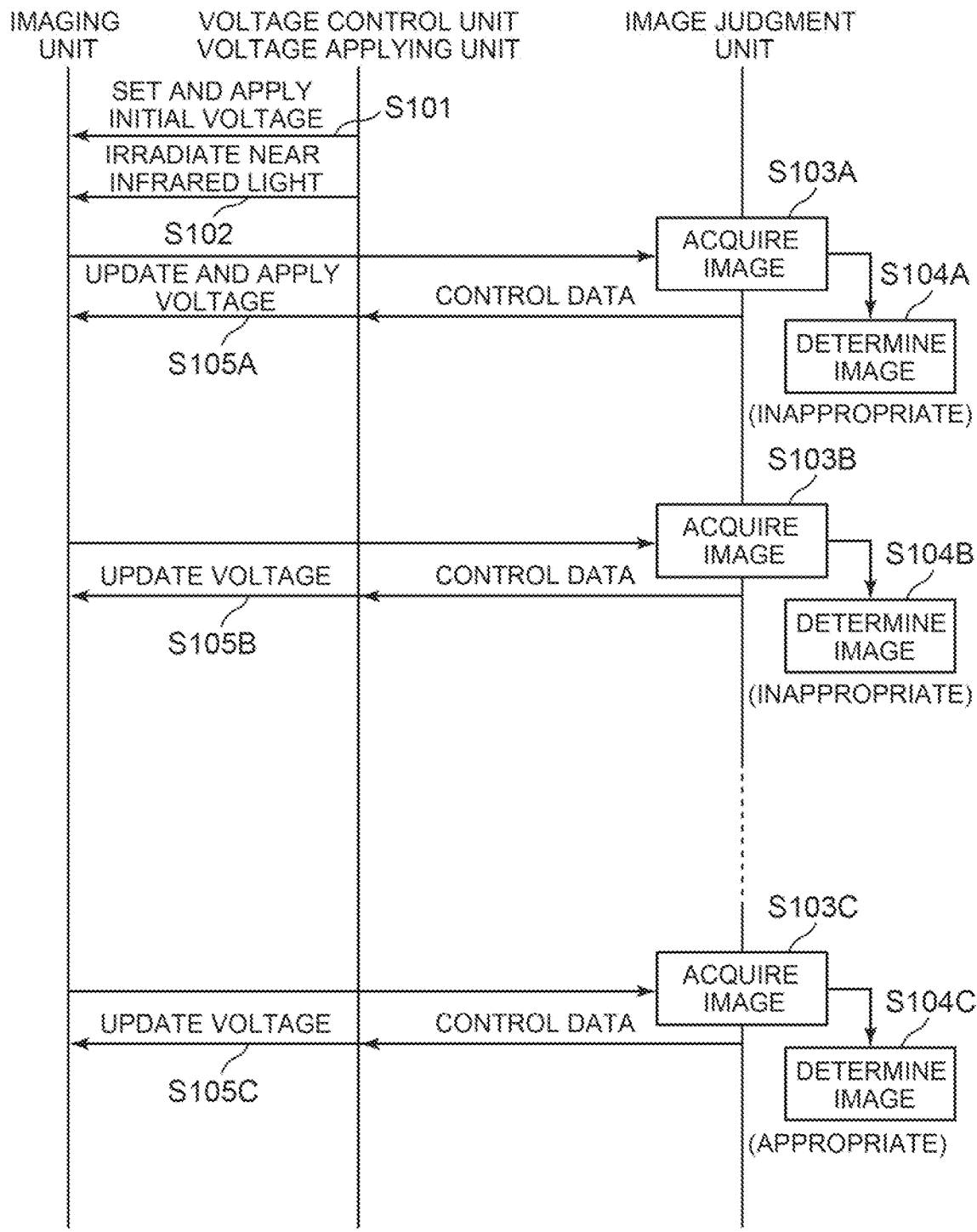
FIG. 5 It depicts a sequence diagram showing an operation of the image acquiring device.

For example, assume that the imaging unit, the voltage control unit, the voltage applying unit, and the image judgment unit shown in FIG. 5 comprises a block of a system controlling the first imaging unit 200A and acquiring images from the first imaging unit 200A. That is, assume that the imaging unit, the voltage control unit, the voltage applying unit, and the image judging unit correspond to the first imaging unit 200A, the first voltage control unit 121, the first voltage applying unit 111, and the image judgment unit 130. In that case, the second imaging unit 200B, the second voltage control unit 122, the second voltage control unit 122, the second voltage applying unit 112, and the image judging unit 130 perform the same operations as those shown in FIG. 5, with a delay time T delayed against the operations shown in FIG. 5, for the second imaging unit 200B.

When the operation of the image acquiring device 100 is started, the first voltage control unit 121 receives control data (indicating the start of processing) from the image judgment unit 130. The first voltage control unit 121 sets the voltage information (the first voltage information) representing the initial value and outputs it to the first voltage applying unit 111 and the second voltage control unit 122 (step S101).

The first voltage applying unit 111 applies an initial voltage to the liquid lens in the first imaging unit 200A according to the first voltage information (step S101). The initial voltage is, for example, a voltage for setting a camera focus to an initial position, for example, the edge closest to the camera in the focus moving range (refer to "front" in FIG. 1). When a delay time T elapses from the time when the first voltage information is input, the second voltage applying unit 112 outputs inputted first voltage information to the second voltage applying unit 112 as the second voltage information. The second voltage applying unit 112 applies an initial voltage to the liquid lens in the second imaging unit 200B according to the second voltage information (step S101).

When the process of step S101 is executed, the first voltage applying unit 111 and the second voltage applying unit 112 output a lighting instruction to the lighting devices 202A, 202B. In response to the lighting instruction, the lighting devices 202A, 202B emit light (step S102). In this example embodiment, suppose that when the initial voltage is applied to the liquid lens, the lighting devices 202A, 202B start emitting light, and end emitting light when the image judgment unit 130 inputs an in-focus image. Therefore, in this example embodiment, the process of step S103 is performed only once. As mentioned above, the first voltage applying unit 111 and the second voltage applying unit 112 may output a lighting instruction at each of the timings at which the first imaging unit 200A and the second imaging unit 200B photographs.

In addition, the first voltage applying unit 111 and the second voltage applying unit 112 may output a lighting instruction to the lighting devices 202A, 202B before applying voltage to the first imaging unit 200A and the second imaging unit 200B. The first voltage applying unit 111 and the second voltage applying unit 11 may start applying voltage and outputting a lighting instruction at the same time.

The image judging unit 130 inputs images (iris images) taken by the first imaging unit 200A and the second imaging units 200B (step S103A). In other words, the image judging unit 130 acquire images taken by the first imaging unit 200A and the second imaging unit 200B. The image judging unit 130 acquires an image from the second imaging unit 200B after a delay time T has elapsed from the time when the image judging unit 130 acquires an image from the first imaging unit 200A.

The image judgment unit 130 determines whether the acquired image is appropriate (step S104A). The image judgment unit 130 determines whether the input image is appropriate or not using clarity of the image, for example, contrast. Specifically, the image judging unit 130 detects the contrast of the image. When the contrast exceeds a predetermined threshold value, the image judgment unit 130 determines that the acquired image is an in-focus image taken at the in-focus position and is an appropriate image. If both the image input from the first imaging unit 200A and the image input from the second imaging unit 200B are determined to be appropriate, the image judgment unit 130 assumes that the image with the higher contrast is the appropriate image.

Further, the image judgment unit 130 outputs control data indicating update of the applied voltage (increase or decrease of voltage value) to the first voltage control unit 121. When the control data is input, the first voltage control unit 121 outputs voltage information (first voltage information) that can identify the updated voltage value to the first voltage applying unit 111 and the second voltage control unit 122 (step S105A).

When the image input cycle and the switching cycle of the voltage value applied to the liquid lens are set to be the same level, the image judgment unit 130 outputs the control data indicating update of the applied voltage when acquiring an image from the first imaging unit 200A. However, it is not essential for the image judging unit 130 to output control data indicating update of the applied voltage when acquiring an image. For example, the image judging unit 130 may output control data indicating update of the applied voltage asynchronous to the time of image acquisition (as an example, the image acquisition interval: 16 ms, while the voltage update interval: 100 ms). In such a case, the image judging unit 130 acquires multiple images between the time the voltage value is updated and the next update.

When the image judgment unit 130 determines that an appropriate image has been acquired, the process is terminated. FIG. 5 shows an example in which, after the process of step S105A (updating and applying the voltage) is performed, an appropriate image is not acquired by the process of step S104B. Further, FIG. 5 shows an example in which, after the process of step S105B (updating and applying voltage) is performed, an appropriate image is acquired by the process of step S104C.

In this example embodiment, even if the in-focus image is acquired when the eyelids of the object 50 are closed due to blinking, etc., that is, even if the in-focus image is not suitable for iris recognition, the possibility of obtaining an in-focus image that can be used for iris recognition, etc. immediately after becomes high. In the example shown in FIG. 1B, when an in-focus image acquired first is not suitable for iris recognition, the in-focus image suitable for iris recognition cannot be acquired until at least "time to return" has passed. However, in this example embodiment, if the in-focus image acquired first is not suitable for iris recognition, there is a possibility that an in-focus image suitable for iris recognition can be acquired after the delay time T elapses. In other words, in this example embodiment, the possibility of obtaining an in-focus image suitable for iris recognition in a short period of time increases. Therefore, as a result, the time until the image used for image processing is acquired can be shortened.

In this example embodiment, the first voltage control unit 121 and the second voltage control unit 122 are separately, however a voltage control unit that includes the functions of the first voltage control unit 121 and the second voltage control unit may be provided. Such a voltage control unit outputs the above first voltage information and also performs delay processing related to the second voltage information and outputs the above second voltage information.

In this example embodiment, the first imaging unit 200A and the second imaging unit 200B including a liquid lens are used, however it is also possible to use a lens that is physically driven by a motor in at least one of the first imaging unit 200A and the second imaging unit 200B.

Example Embodiment 2

Iris recognition involves two phases. One is a registration phase in which the iris features of a large number of objects 50 are registered in a database, etc. Another is an authentication phase in which the iris features of a object 50 are compared with iris features of a large number of subjects registered in a database, etc. In the authentication phase, 850 nm wavelength band and 940 nm wavelength band are widely used.

It is not desirable for the wavelength band used in the registration phase to be different from it used in the authentication phase.

Therefore, in the registration phase, it is desirable to register the iris features acquired from an image acquired using light in the 850 nm wavelength band and an image acquired using light in the 940 nm wavelength band, respectively, in a database or the like in the registration phase.

When registering iris features based on images acquired from each of those in a database or the like, two imaging units (the first imaging unit 200A and the second imaging unit 200B) is considered to be used. Specifically, the wavelengths of light emitted by the lighting devices 202A, 202B are differentiated. For example, one light has a wavelength of 850 nm and the other has a wavelength of 940 nm. Then, the first imaging unit 200A and the second imaging unit 200B are each equipped with a bandpass filter. The passband of one bandpass filter is the 850 nm band, and the passband of the other bandpass filter is the 940 nm band. When set up in such a way, the image judgment unit 130 can obtain both images acquired using light of the 850 nm wavelength band and using light of the 940 nm wavelength band.

The delay control as illustrated in FIG. 1C is not performed in this example embodiment. In other words, the two imaging units together change the focal length. In this example embodiment, the light of the 850 nm wavelength band and the light of the 940 nm wavelength band are used, however used wavelengths of light are not limited to those.

Example Embodiment 3

Figure 6:
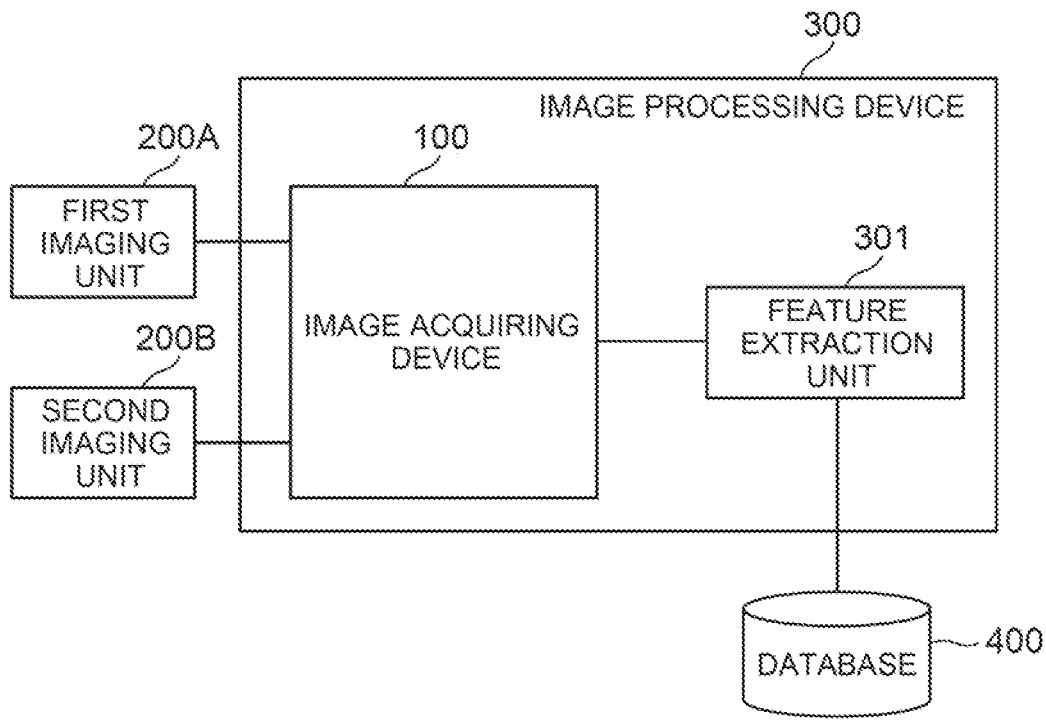
FIG. 6 It depicts a block diagram showing an example of the configuration of an imaging processing device.

FIG. 6 is a block diagram showing the imaging processing device of the third example embodiment. The image processing device 300 shown in FIG. 6 includes the image acquiring device 100 of the first example embodiment and a feature extraction unit 301.

The feature extraction unit 301 inputs an image which is determined as an appropriate image by the image judgment unit 130 in the image acquiring device 100. The feature extraction unit 301 extracts the iris region (excluding the pupil) from the input image and generates features (iris features) of the iris region. The feature extraction unit 301 then stores the iris features in the database 400. The imaging processing device 300 shown in FIG. 6 executes the registration phase process in iris recognition. The feature extraction unit 301 can use any existing feature generation algorithm when generating the iris features.

As mentioned above, the in-focus image output by the image acquiring device 100 is likely to be an image (an image suitable for iris recognition) acquired when the eyelids of the object 50 are not closed, etc. Therefore, in this example embodiment, the time required for processing the registration phase in iris recognition is shortened as a result.

Example Embodiment 4

Figure 7:
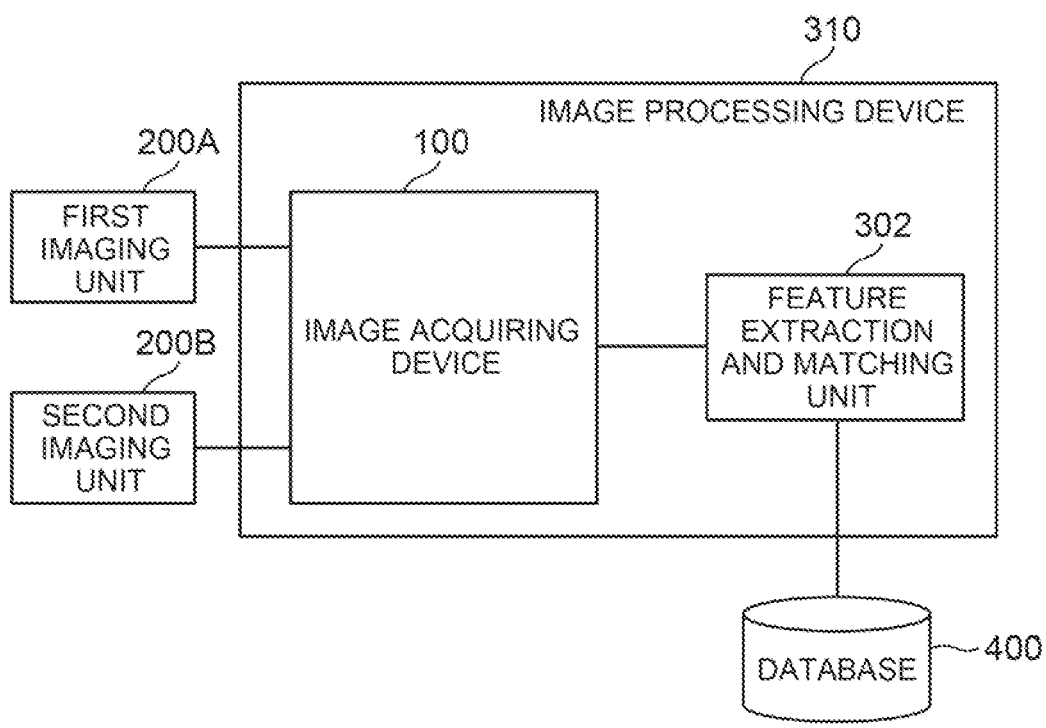
FIG. 7 It depicts a block diagram showing another example of the configuration of an imaging processing device.

FIG. 7 is a block diagram showing the image processing device of the fourth example embodiment. The image processing device 310 shown in FIG. 7 includes the image acquiring device 100 of the first example embodiment and a feature extraction and matching unit 302. The database 400 stores iris features of a number of objects.

The feature extraction and matching unit 302 inputs an image which is determined as an appropriate image by the image judgment unit 130 in the image acquiring device 100. The feature extraction and matching unit 302 extracts the iris region (excluding the pupil) from the input image and generates iris features of the iris region. Then, the feature extraction and matching unit 302 compares (matches) the generated iris features with a number of iris features stored in the database 400. When the generated iris features matches any of the iris features stored in the database 400, the feature extraction and matching unit 302 considers that the authentication of the object 50 succeeds.

As mentioned above, the in-focus image output by the image acquiring device 100 is likely to be an image (an image suitable for iris recognition) acquired when the eyelids of the object 50 are not closed, etc. Therefore, in this example embodiment, the time required for processing the registration phase in iris recognition is shortened as a result.

The third and fourth example embodiments may be combined. That is, the image acquiring device 100, the feature extraction unit 301, and the feature extraction and matching unit 302 may form an image processing device.

Each component (except for the first voltage applying unit 111 and the second voltage applying unit 112) in the image acquiring devices of each of the above example embodiments may be configured with a piece of hardware or a piece of software. Alternatively, the components may be configured with a plurality of pieces of hardware or a plurality of pieces of software. Further, part of the components may be configured with hardware and the other part with software.

The functions (processes) in the above example embodiments may be realized by a computer having a processor such as a CPU (Central Processing Unit), a memory, etc. For example, a program for performing the method (processing) in the above example embodiments may be stored in a storage device (storage medium), and the functions may be realized with the CPU executing the program stored in the storage device. In addition, instead of a CPU, a GPU (Graphics Processing Unit), an FPGA (Field-Programmable Gate Array), a DSP (Digital Signal Processor (DSP), or an ASIC (Application Specific Integrated Circuit) may be used. Further, multiple out of a CPU, a GPU, a FPGA, a DSP and an ASIC may be used in parallel.

Figure 8:
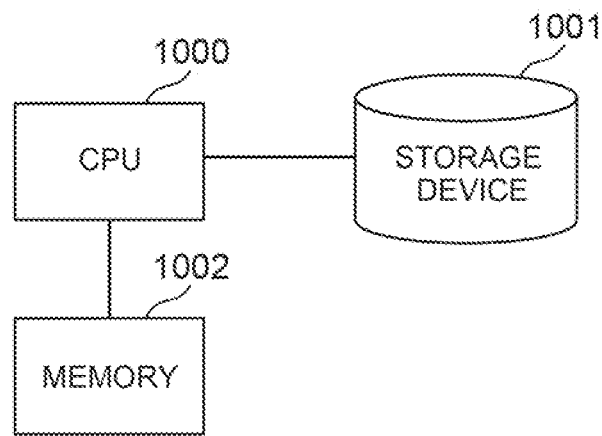
FIG. 8 It depicts a block diagram showing an example of a computer with a CPU.

FIG. 8 is a block diagram of a computer with a CPU. The computer can be implemented in each of the image acquiring device 100 and the image processing devices 300, 310. The CPU 1000 executes processing in accordance with a program (software element: codes) stored in a storage device 1001 to realize the functions in the above exemplary embodiments. That is, the computer realizes the functions of the first voltage control unit 121, the second voltage control unit 122, image judgment unit 130, feature extraction unit 301, and feature extraction and matching unit 302 in the image acquiring device 100 and image processing devices 300, 310, the first voltage control unit 121, the second voltage control unit 122, image judgment unit 130, feature extraction unit 301, and feature extraction and matching unit 302 in FIG. 2, FIG. 6, and FIG. 7.

The storage device 1001 is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disk), a compact disc-read only memory (CD-ROM), a compact disc-recordable (CD-R), a compact disc-rewritable (CD-R/W), and a semiconductor memory (for example, a mask ROM, a PROM (programmable ROM), an EPROM (erasable PROM), a flash ROM). The storage device 1001 can also be used as a database 400.

The program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 9:
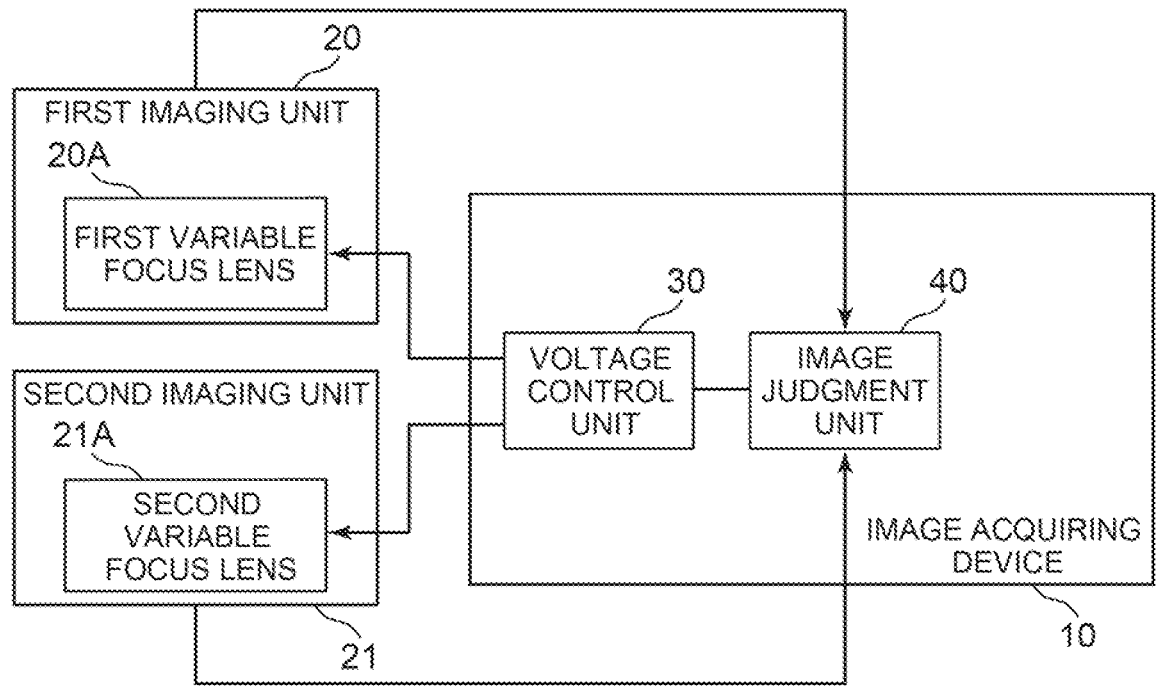
FIG. 9 It depicts a block diagram showing an overview of the image acquiring device.

FIG. 9 is a block diagram showing the main part of the image acquiring device. The image acquiring device 10 shown in FIG. 9 comprises the voltage control unit (voltage control means) 30 (in the example embodiments, realized by the first voltage control unit 121 and the second voltage control unit 122) which generates first voltage information that can identify voltage applied to the first variable-focus lens 20A (in the example embodiments, realized by the liquid lens 211) included in the first imaging unit (first imaging means) 20 (in the example embodiments, realized by the first imaging unit 200A) installed in a position where a subject can be photographed and whose focal length changes in accordance with an applied voltage, and generates second voltage information that can identify voltage applied to the second variable-focus lens 21A (in the example embodiments, realized by the liquid lens 211) included in the second imaging unit (second imaging means) 21 (in the example embodiments, realized by the second imaging unit 200B) installed in the position where the subject can be photographed and whose focal length changes in accordance with an applied voltage, and the image judgment unit (image judgment means) 40 (in the example embodiments, realized by the image judging unit 130) which inputs images from the first imaging unit 20 and the second imaging unit 21, and selects one image taken at an in-focus position among input images, wherein the voltage control unit 30 generates information, as the first voltage information, that can identify each voltage in a time series of voltages whose values change with time, and generates information, as the second voltage information, that can identify that each of the voltages identified by the first voltage information is applied to the second variable-focus lens 21A after a predetermined period of delay.

A part of or all of the above example embodiments may also be described as, but not limited to, the following supplementary notes.

(Supplementary note 1) An image acquiring device comprising:
  voltage control means for generating first voltage information that can identify voltage applied to a first variable-focus lens which is included in first imaging means installed in a position where a subject can be photographed and whose focal length changes in accordance with an applied voltage, and generating second voltage information that can identify voltage applied to a second variable-focus lens which is included in second imaging means installed in the position where the subject can be photographed and whose focal length changes in accordance with an applied voltage; and
  image judgment means for inputting images from the first imaging means and the second imaging means, and selecting one image taken at an in-focus position among input images,
  wherein the voltage control means
  generates information, as the first voltage information, that can identify each voltage in a time series of voltages whose values change with time, and
  generates information, as the second voltage information, that can identify that each of the voltages identified by the first voltage information is applied to the second variable-focus lens after a predetermined period of delay.

(Supplementary note 2) The image acquiring device according to Supplementary note 1, wherein
  the predetermined period is selected from 100 to 300 ms.

(Supplementary note 3) The image acquiring device according to Supplementary note 1 or 2, wherein
  the image judgment means selects the image whose contrast exceeds a predetermined value among the images input from the first imaging means and the second imaging means.

(Supplementary note 4) The image acquiring device according to any one of Supplementary notes 1 to 3, further comprising
  first voltage applying means for applying a voltage of a value identified by the first voltage information to the first variable-focus lens, and
  second voltage applying means for applying a voltage of a value identified by the second voltage information to the second variable-focus lens.

(Supplementary note 5) The image acquiring device according to Supplementary note 4, wherein
  the first voltage applying means applies the voltage to a liquid lens as the first variable-focus lens, and
  the second voltage applying means applies the voltage to a liquid lens as the second variable-focus lens.

(Supplementary note 6) An image processing device comprising:
  the image acquiring device according to any one of Supplementary notes 1 to 5, and
  feature extraction means for generating features of an iris region of the subject from the in-focus image selected by the image judging means.

(Supplementary note 7) An image processing device comprising:
  the image acquiring device according to any one of Supplementary notes 1 to 5, and
  feature extraction and matching means for generating features of an iris region of the subject from the in-focus image selected by the image judging means and matching the features with previously acquired features of the iris region.

(Supplementary note 8) An image processing device comprising:
  the image acquiring device according to any one of Supplementary notes 1 to 5,
  feature extraction means for generating features of an iris region of the subject from the in-focus image selected by the image judging means, and
  feature extraction and matching means for generating features of the iris region of the subject from the in-focus image selected by the image judging means and matching the features with previously acquired features of the iris region.

(Supplementary note 9) An image acquiring method comprising
  generating first voltage information that can identify voltage applied to a first variable-focus lens which is included in first imaging means installed in a position where a subject can be photographed and whose focal length changes in accordance with an applied voltage, and generating second voltage information that can identify voltage applied to a second variable-focus lens which is included in second imaging means installed in the position where the subject can be photographed and whose focal length changes in accordance with an applied voltage, wherein
the first voltage information is information that can identify each voltage in a time series of voltages whose values change with time,
the second voltage information is information that can identify information that each of the voltages identified by the first voltage information is applied to the second variable-focus lens after a predetermined period of delay, and
the method further comprises selecting one image taken at an in-focus position among images input from the first imaging means and the second imaging means.

(Supplementary note 10) The image acquiring method according to Supplementary note 9, wherein
the predetermined period is selected from 100 to 300 ms.

(Supplementary note 11) The image acquiring method according to Supplementary note 9 or 10, further comprising
selecting the image whose contrast exceeds a predetermined value among the images input from the first imaging means and the second imaging means.

(Supplementary note 12) An image acquiring program causing a computer to execute:
a process of generating first voltage information that can identify voltage applied to a first variable-focus lens which is included in first imaging means installed in a position where a subject can be photographed and whose focal length changes in accordance with an applied voltage, and generating second voltage information that can identify voltage applied to a second variable-focus lens which is included in second imaging means installed in the position where the subject can be photographed and whose focal length changes in accordance with an applied voltage,
wherein
the first voltage information is information that can identify each voltage in a time series of voltages whose values change with time,
the second voltage information is information that can identify information that each of the voltages identified by the first voltage information is applied to the second variable-focus lens after a predetermined period of delay, and
the image acquiring program causes the computer to further execute a process of selecting one image taken at an in-focus position among images input from the first imaging means and the second imaging means.

(Supplementary note 13) The image acquiring program according to Supplementary note 12, causing the computer execute a process of selecting the image whose contrast exceeds a predetermined value among the images input from the first imaging means and the second imaging means.

(Supplementary note 14) A computer readable recording medium storing an image acquiring program causing a computer to execute
a process of generating first voltage information that can identify voltage applied to a first variable-focus lens which is included in first imaging means installed in a position where a subject can be photographed and whose focal length changes in accordance with an applied voltage, and generating second voltage information that can identify voltage applied to a second variable-focus lens which is included in second imaging means installed in the position where the subject can be photographed and whose focal length changes in accordance with an applied voltage,
wherein
the first voltage information is information that can identify each voltage in a time series of voltages whose values change with time,
the second voltage information is information that can identify information that each of the voltages identified by the first voltage information is applied to the second variable-focus lens after a predetermined period of delay, and
the image acquiring program causes the computer to further execute a process of selecting one image taken at an in-focus position among images input from the first imaging means and the second imaging means.

(Supplementary note 15) The recording medium according to Supplementary note 14, wherein
the image acquiring program causes the computer to further execute a process of selecting the image whose contrast exceeds a predetermined value among the images input from the first imaging means and the second imaging means.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

10 Image acquiring device
20 First imaging unit
21 Second imaging unit
20A First variable focus lens
21A Second variable focus lens
30 Voltage control unit
40 Image judgment unit
50 Object
100 Image acquiring device
111 First voltage applying unit
112 Second voltage applying unit
121 First voltage control unit
122 Second voltage control unit
130 Image judgment unit
200 Imaging unit
200A First imaging unit
200B Second imaging unit
202A, 202B Lighting device
211 Liquid lens
212 Image sensor
300, 310 Image processing device
301 Feature extraction unit
302 Feature extraction and matching unit
400 Database
1000 CPU
1001 Storage device
1002 Memory

What is claimed is:
1. An image acquiring device comprising:
a voltage control unit which generates first voltage information that can identify voltage applied to a first variable-focus lens which is included in a first imaging unit installed in a position where a subject can be photographed and whose focal length changes in accordance with an applied voltage, and generates second voltage information that can identify voltage applied to a second variable-focus lens which is included in a second imaging unit installed in the position where the subject can be photographed and whose focal length changes in accordance with an applied voltage; and an image judgment unit which inputs images from the first imaging unit and the second imaging unit, and selecting one image taken at an in-focus position among input images, wherein the voltage control unit generates information, as the first voltage information, that can identify each voltage in a time series of voltages whose values change with time, and generates information, as the second voltage information, that can identify that each of the voltages identified by the first voltage information is applied to the second variable-focus lens after a predetermined period of delay.

2. The image acquiring device according to claim 1, wherein
the predetermined period is selected from 100 to 300 ms.

3. The image acquiring device according to claim 1, wherein
the image judgment unit selects the image whose contrast exceeds a predetermined value among the images input from the first imaging unit and the second imaging unit.

4. The image acquiring device according to claim 1, further comprising
a first voltage applying unit which applies a voltage of a value identified by the first voltage information to the first variable-focus lens, and
a second voltage applying unit which applies a voltage of a value identified by the second voltage information to the second variable-focus lens.

5. The image acquiring device according to claim 4, wherein
the first voltage applying unit applies the voltage to a liquid lens as the first variable-focus lens, and
the second voltage applying unit applies the voltage to a liquid lens as the second variable-focus lens.

6. An image processing device comprising:
the image acquiring device according to claim 1, and
a feature extraction unit which generates features of an iris region of the subject from the in-focus image selected by the image judging unit.

7. An image acquiring method comprising
generating first voltage information that can identify voltage applied to a first variable-focus lens which is included in a first imaging unit installed in a position where a subject can be photographed and whose focal length changes in accordance with an applied voltage, and generating second voltage information that can identify voltage applied to a second variable-focus lens which is included in a second imaging unit installed in the position where the subject can be photographed and whose focal length changes in accordance with an applied voltage,
wherein
the first voltage information is information that can identify each voltage in a time series of voltages whose values change with time,
the second voltage information is information that can identify information that each of the voltages identified by the first voltage information is applied to the second variable-focus lens after a predetermined period of delay, and
the method further comprises selecting one image taken at an in-focus position among images input from the first imaging unit and the second imaging unit.

8. The image acquiring method according to claim 7, wherein
the predetermined period is selected from 100 to 300 ms.

9. The image acquiring method according to claim 7, further comprising
selecting the image whose contrast exceeds a predetermined value among the images input from the first imaging unit and the second imaging unit.

* * * * *